(12) United States Patent
Van De Flier et al.

(10) Patent No.: US 7,730,996 B2
(45) Date of Patent: Jun. 8, 2010

(54) LONG FIBER THERMOPLASTIC COMPOSITE MUFFLER SYSTEM WITH INTEGRATED CRASH MANAGEMENT

(75) Inventors: Peter B. Van De Flier, Rilland (NL); Luc Peters, Luxembourg (BE); Juergen P. Wiemann, Leiferde (DE); Peter Derks, Av Neer (NL); Norman T. Huff, Brighton, MI (US)

(73) Assignee: OCV Intellectual Capital, LLC DE (US)

( * ) Notice: Subject to any disclaimer, the term of this patent is extended or adjusted under 35 U.S.C. 154(b) by 363 days.

(21) Appl. No.: 11/402,343

(22) Filed: Apr. 12, 2006

(65) Prior Publication Data
US 2009/0014236 A1    Jan. 15, 2009

(51) Int. Cl.
*F01N 1/24* (2006.01)
*F01N 1/10* (2006.01)
*F01N 1/04* (2006.01)
*F01N 13/16* (2006.01)
*F01N 1/02* (2006.01)
*F01N 1/08* (2006.01)
*F01N 13/00* (2006.01)

(52) U.S. Cl. ................ 181/256; 181/252; 181/246
(58) Field of Classification Search ............ 181/256, 181/252, 246, 244, 245, 249, 255, 269, 272, 181/282
See application file for complete search history.

(56) References Cited
U.S. PATENT DOCUMENTS

| | | | |
|---|---|---|---|
| 2,220,866 A | * | 11/1940 | Jensen et al. ................ 181/250 |
| 2,658,580 A | * | 11/1953 | Trembley .................... 181/283 |
| 3,016,972 A | | 1/1962 | Dugas |
| 3,176,791 A | | 4/1965 | Betts et al. |
| 3,233,699 A | | 2/1966 | Plummer |
| 3,670,845 A | | 6/1972 | Betts |
| 3,677,365 A | | 7/1972 | Wright et al. |
| 4,026,381 A | | 5/1977 | Conley |
| 4,213,414 A | * | 7/1980 | Sato et al. ................. 440/89 R |
| 4,239,091 A | | 12/1980 | Negrao |
| 4,350,223 A | | 9/1982 | Takei |
| 4,356,886 A | * | 11/1982 | Daude et al. ................. 181/250 |

(Continued)

FOREIGN PATENT DOCUMENTS

DE    2927758    1/1981

(Continued)

*Primary Examiner*—Edgardo San Martin
(74) *Attorney, Agent, or Firm*—James J. Dottavio; Kathryn W. Grant

(57) ABSTRACT

The present invention provides composite muffler systems formed of a long fiber thermoplastic. Long fiber thermoplastic technology allows the fibers, to maintain a length sufficient to provide structural strength at lower fiber loading. The long fiber thermoplastic material for forming composite muffler systems also provides increased impact strength and creep resistance as well as chemical and thermal resistance. Mufflers molded with long fiber thermoplastics demonstrate improved dimensional stability as compared to known short fiber based moldings. One suitable muffler structure is a multi-piece muffler assembly including at least one long fiber thermoplastic shell section. In accordance with the present invention, the long fiber thermoplastic material and moldings may also be combined with over-molding of preforms of unidirectional or woven inlays, which provide local structural performance. The use of such preforms is particularly suited to use in the manufacture of high temperature, structural articles such as bumper muffler combinations.

17 Claims, 7 Drawing Sheets

U.S. PATENT DOCUMENTS

| | | | | |
|---|---|---|---|---|
| 4,513,841 A * | 4/1985 | Shimoji et al. | | 181/252 |
| 4,523,662 A * | 6/1985 | Tanaka et al. | | 181/249 |
| 4,569,471 A * | 2/1986 | Ingemansson et al. | | 228/176 |
| 4,607,721 A * | 8/1986 | Tanaka et al. | | 181/249 |
| 4,693,338 A | 9/1987 | Clerc | | |
| 5,020,631 A * | 6/1991 | DeVille | | 181/249 |
| 5,036,585 A * | 8/1991 | Schweinfurth | | 29/890.08 |
| 5,052,513 A | 10/1991 | Yoshikawa et al. | | |
| 5,107,953 A | 4/1992 | Shimizu et al. | | |
| 5,305,824 A * | 4/1994 | Gasseling | | 165/47 |
| 5,321,214 A | 6/1994 | Uegane et al. | | |
| 5,325,438 A | 6/1994 | Browning et al. | | |
| 5,340,952 A * | 8/1994 | Takiguchi | | 181/282 |
| 5,365,025 A | 11/1994 | Kraai et al. | | |
| 5,464,952 A * | 11/1995 | Shah et al. | | 181/211 |
| 5,468,923 A | 11/1995 | Kleyn | | |
| 5,477,014 A | 12/1995 | Dunne et al. | | |
| 5,543,212 A | 8/1996 | Oosedo et al. | | |
| 5,550,338 A * | 8/1996 | Hielscher | | 181/290 |
| 5,726,398 A | 3/1998 | Zahn et al. | | |
| 5,766,541 A * | 6/1998 | Knutsson et al. | | 264/571 |
| 5,969,300 A * | 10/1999 | Ford | | 181/282 |
| 5,972,503 A | 10/1999 | Woodside | | |
| 5,976,453 A * | 11/1999 | Nilsson et al. | | 264/555 |
| 5,996,730 A * | 12/1999 | Pirchl | | 181/211 |
| 6,068,082 A | 5/2000 | D'Amico, Jr. et al. | | |
| 6,089,348 A * | 7/2000 | Bokor | | 181/272 |
| 6,135,237 A | 10/2000 | Allman | | |
| 6,141,958 A * | 11/2000 | Voss | | 60/272 |
| 6,148,955 A * | 11/2000 | Wolf et al. | | 181/252 |
| 6,156,682 A | 12/2000 | Fletemier et al. | | |
| 6,302,466 B1 * | 10/2001 | Zwick | | 296/39.3 |
| 6,364,976 B2 | 4/2002 | Fletemier et al. | | |
| 6,369,157 B1 | 4/2002 | Winckler et al. | | |
| 6,412,596 B1 * | 7/2002 | Brandt et al. | | 181/256 |
| 6,420,047 B2 | 7/2002 | Winckler et al. | | |
| 6,438,949 B1 * | 8/2002 | Nozaki | | 60/322 |
| 6,467,572 B1 * | 10/2002 | Liu | | 181/272 |
| 6,543,577 B1 * | 4/2003 | Ferreira et al. | | 181/282 |
| 6,668,972 B2 | 12/2003 | Huff et al. | | |
| 6,932,188 B2 * | 8/2005 | Ni | | 181/231 |
| 7,240,769 B2 * | 7/2007 | Nezan et al. | | 181/250 |
| 7,273,129 B2 * | 9/2007 | Harwood | | 181/256 |
| 7,281,605 B2 * | 10/2007 | Huff et al. | | 181/250 |
| 7,325,652 B2 * | 2/2008 | Huff et al. | | 181/246 |
| 2001/0011780 A1 * | 8/2001 | Knutsson | | 264/28 |
| 2002/0079162 A1 | 6/2002 | Huff et al. | | |
| 2002/0129991 A1 * | 9/2002 | Lewin | | 181/256 |
| 2003/0130477 A1 | 7/2003 | Winckler et al. | | |
| 2004/0011992 A1 | 1/2004 | Winckler et al. | | |
| 2004/0155380 A1 | 8/2004 | Kendall et al. | | |
| 2004/0220334 A1 | 11/2004 | Wang et al. | | |
| 2004/0262077 A1 | 12/2004 | Huff et al. | | |
| 2005/0023076 A1 | 2/2005 | Huff et al. | | |
| 2005/0115764 A1 | 6/2005 | Mabuchi et al. | | |
| 2005/0150719 A1 | 7/2005 | Gorenflo | | |
| 2005/0279570 A1 * | 12/2005 | Van Arsdale | | 181/256 |
| 2006/0065480 A1 * | 3/2006 | Leehaug | | 181/283 |
| 2006/0124387 A1 * | 6/2006 | Berbner et al. | | 181/290 |
| 2006/0175075 A1 | 8/2006 | Konnik et al. | | |
| 2007/0240932 A1 * | 10/2007 | Van De Flier et al. | | 181/228 |
| 2007/0240934 A1 * | 10/2007 | Van de Flier et al. | | 181/252 |
| 2008/0142295 A1 * | 6/2008 | Huff | | 181/256 |

FOREIGN PATENT DOCUMENTS

| | | |
|---|---|---|
| DE | 3243631 | 5/1984 |
| DE | 3439208 | 4/1986 |
| DE | 3708696 | 9/1988 |
| DE | 3821803 | 2/1990 |
| DE | 10120974 | 5/2002 |
| EP | 0269116 | 6/1988 |
| EP | 0337877 | 10/1989 |
| EP | 0396753 | 11/1990 |
| EP | 0 446 064 | 9/1991 |
| EP | 0446064 | 9/1991 |
| EP | 0692616 | 1/1996 |
| EP | 0794324 | 9/1997 |
| EP | 0816649 | 1/1998 |
| EP | 0855496 | 7/1998 |
| EP | 1114919 | 7/2001 |
| EP | 1172535 | 1/2002 |
| GB | 1 337 998 | 11/1973 |
| GB | 2 129 490 | 5/1984 |
| GB | 2129490 | 5/1984 |
| GB | 2143275 | 2/1985 |
| GB | 2 238 735 | 12/1989 |
| GB | 2 256 006 | 5/1991 |
| JP | 60108514 | 6/1985 |
| JP | 60156922 | 8/1985 |
| JP | 1141031 | 6/1989 |
| JP | 1247712 | 10/1989 |
| JP | 3063409 | 3/1991 |
| JP | 3149309 | 6/1991 |
| JP | 3161575 | 7/1991 |
| JP | 4062053 | 2/1992 |
| JP | 4146930 | 5/1992 |
| JP | 5044147 | 2/1993 |
| JP | 6330722 | 11/1994 |
| JP | 9041256 | 2/1997 |
| WO | WO 8904915 | 6/1989 |
| WO | WO 9927238 | 6/1999 |
| WO | WO 2004098879 | 11/2004 |

* cited by examiner

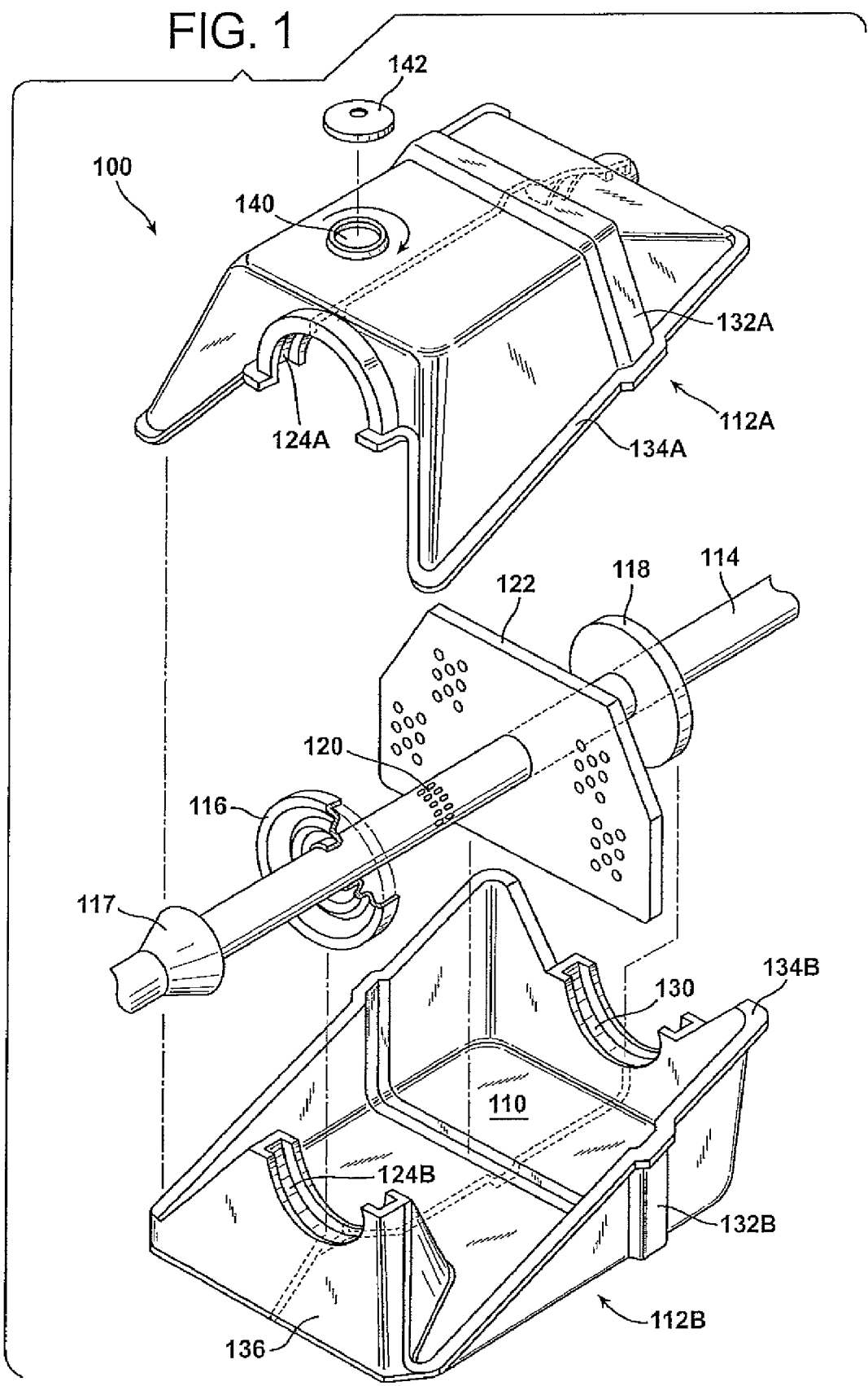

LONG FIBER THERMOPLASTIC COMPOSITE MUFFLER SYSTEM WITH INTEGRATED CRASH MANAGEMENT

TECHNICAL FIELD AND INDUSTRIAL APPLICABILITY OF THE INVENTION

The present invention relates to composite muffler systems including long fibers to provide structural integrity. The mufflers may be molded into shape that allow for their use in confined spaces within a motor vehicle or in combination with a facia to form a part such as bumpers, rocker panels, air dams, spoilers, sideboards and body modules.

SUMMARY OF THE INVENTION

The present invention provides composite muffler systems formed of a long fiber thermoplastic material. Long fiber thermoplastic technology allows the fibers to maintain a length sufficient to provide structural strength at lower fiber loading. The long fiber thermoplastic material for forming composite muffler systems also provides increased impact strength and creep resistance as well as chemical and thermal resistance. Mufflers molded with long fiber thermoplastics demonstrate improved dimensional stability as compared to conventional short fiber based moldings. One suitable muffler structure is a multi-piece muffler assembly including at least one long fiber thermoplastic shell section. In accordance with the present invention, the long fiber thermoplastic material and moldings may also be combined with over-molding of preforms of unidirectional or woven inlays, which provide local structural performance. The use of such preforms is particularly suited for use in the manufacture of high temperature, structural articles such as bumper muffler combinations.

The long fiber thermoplastic molding for composite mufflers of the present invention allows for complex geometry and part integration reducing assembly steps, and shapes to match vehicle design space either as separate unit or integrated into other vehicle components such as bumper systems, air dams, wheel wells, rocker panels, and others, providing packaging space reduction and better economics and improved properties than prior art methods. The combination of long fiber thermoplastics with filling systems and in addition combined with integrated airflow promoting features allows for reduced surface temperature which further reducing the need for heat shielding that is typical in cars as well as a reduction in packaging space. Other features can also be integrated such as underbody protection functions and attachment features to the car body.

The use of long fiber thermoplastics based articles allows for the use of a range of molding technologies such as injection molding and compression molding with long fiber thermoplastic pellets as input. It is also possible to use direct compounding variants of the pellets or compression molding of pre-compounded sheets using either random fibers or sheets based on woven fibers and hybrids. The fibers are typically glass based but may alternatively be carbon, mineral, natural, steel, copper, other metal or synthetic fibers such as aramids.

The use of long fiber thermoplastic materials allows for the manufacture of intricate design details and allows the use of several muffler shell connecting methods. The design with long fiber thermoplastic materials is particularly suited for stacked assembling of the components allowing higher efficiency and potential for automated assembly.

In accordance with a first aspect of the present invention, a muffler assembly is provided as a part of a motor vehicle component such as a bumper, rocker panel, air dam, or sideboard. The muffler having an outer shell formed from a long fiber thermoplastic composite material that may form part of the component or be formed to conform to the outer facia of such a component. That is, the muffler may be a separate element from the component coupled thereto or is formed as an integral part of the component. The perforated pipe may include openings formed by completely removing small metal portions from the pipe. Alternatively, the perforated pipe may comprise a louvered pipe, wherein the openings are formed by cutting and subsequently bending small sections of the pipe outwardly. While a straight, flow through pipe is shown in the figures, for simplicity, the pipe may include bent sections to form an s-curve or other complex curve within the muffler assembly.

The muffler further comprises a perforated pipe for receiving exhaust gases, and fibrous material provided within the outer shell between the perforated pipe and the outer shell. The fibrous material may be formed of multiple material preforms that are received respectfully in the first and second shell parts. Alternatively, the fibrous material may comprise a loose or bagged 'texturized' wool-type product provided within an internal cavity of the outer shell. It is also contemplated that the fibrous material may be a mat product wrapped about the perforated pipe or otherwise filling the internal cavity of the outer shell. It is also contemplated that combinations of these fill techniques may be used. For example, a mat product may be installed within the shell to act as a secondary heat and air insulator section while the primary insulation is a preform or a form of 'texturized' wool installed between the mat and the pipe.

The muffler assembly may further comprise a heat shield positioned between the muffler outer shell and the exhaust pipe. It may also comprise at least one bushing for holding a portion of the perforated pipe within the outer shell. The bushings may serve several tasks including acting as a heat sink to reduce the temperature of the pipe, as a vibration absorber to reduce the physical stress transmitted from the engine to the muffler shell or as a structural reinforcement that act as part of the motor vehicle crash management system. The muffler typically a main body having front, rear, upper and lower surfaces. A portion of the main body may define at least a part of an outer shell of the muffler as well as a facia, or aesthetic surface, of the motor vehicle.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principle of the invention. In the drawings:

FIG. 1 is an exploded perspective view of a thermoplastic muffler in accordance with the present invention.

DETAILED DESCRIPTION AND PREFERRED EMBODIMENTS OF THE INVENTION

Figure 1A:
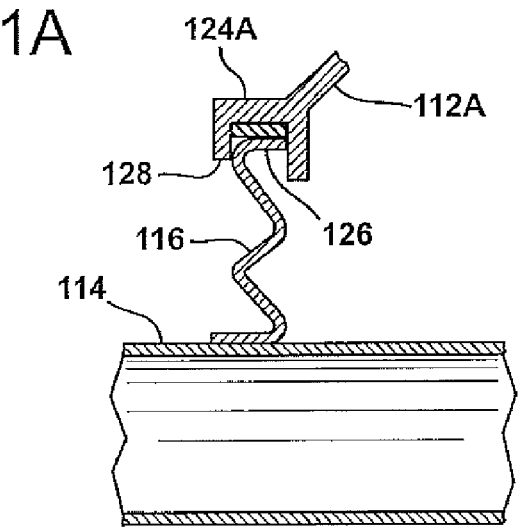
FIG. 1A is a partial cross-section of a muffler according to the present invention taken along line A-A of FIG. 1.

A long fiber thermoplastic composite muffler 100 according to the present invention is shown in FIG. 1 including first and second outer shells 112A and 112B, a porous pipe 114 and entry bushing 116 and exit bushing 118 for fluid communication of exhaust from an internal combustion engine to the interior of the chamber 110 via orifices 120 and then to the atmosphere.

As shown in FIG. 1 the first and second outer shells 112A, 112B may be shaped to fit within a space under a vehicle body. A baffle 122 may be included within the chamber of the muffler 100. The baffle separates the interior of the shell into discrete zones and serves to improve the acoustical performance of the muffler and may optionally be perforated to allow fluid communication between the discrete zones formed by the baffle 122. The chamber may be filled with a fibrous absorber (not shown) between the porous pipe 114 and the inner surface of the muffler chamber 110. Such absorptive silencers efficiently reduce acoustical energy by the sound absorbing characteristics of the sound absorbing material. As shown in FIG. 1A, the bushing 116 may be shaped to include a sinusoidal or other formed increased surface area act as heat sink to reduce the temperatures to suitable levels at the metal polymer interface. The shells 112A, 112B include a flange 124A to receive the outer edge 126 of bushing 116. The coupling between edge 126 and flange 124A may include a seal 128, preferably formed of a flexible high temperature seal such as Viton (available from duPont of Wilmington, Del., USA) or a silicone based sealant. The seal 128 further reduces the temperature of the bushing 116 at flange 124A, provides tolerance compensation and compensates for differential coefficient of thermal expansion. The seal 128 may be placed on the bushing 116 as a single ring or may be molded into the muffler shells. While a rectangular flange 124A is shown, the interface may have any suitable geometry that provides sealing and positioning. The bushing interface geometry is typically circular shape perpendicular to the exhaust pipe but can also have other shapes or positions.

As seen in FIG. 1, first shell 112A preferably includes a flange 124A at the entrance end of the muffler 100 and a second flange (not shown) at the exit end of the muffler. The second shell 114B preferably includes a flange 124B at the entrance end of the muffler 100 and a second flange 130 at the exit end of the muffler. In accordance with on embodiment of the invention, the first shell 112A may include a molded flange 132A and the second shell 112B may include a molded flange 132B to receive the outer edge of baffle 122. The molded flanges 132A, 132B may include a seal (not shown) similar to seal 128. The muffler 100 may include an air guide 136 on the leading edge of the muffler 100 to increase airflow toward the bushing 116. The increased airflow and cooling is beneficial at the upstream bushing 116 because the upstream bushing 116 is closer to the engine and thus operates at a higher temperature than bushing 118. A heat sink 117 may optionally be added to the exhaust pipe 114 out side of the muffle 100 to decrease the temperature at bushing 116.

In accordance with the present invention, the muffler 100 is assembled to include porous pipe 114 and baffle 122. The shells 112A, 112B are brought together so that edges 134A, 134B are in contact. The edges 134A, 134B may then be bonded by a variety of methods such as thermal bonding, ultrasonic welding, laser welding, and adhesives or may be mechanically coupled by a snap fit mechanism or a number of hooks.

The assembled muffler 100 may have cavity 110 filled with a fibrous thermal and acoustical insulation (not shown) by any number of methods known to those skilled in the art. For example in a direct fill method, a plurality of filaments that are separated or texturized via pressurized air to form a loose wool-type product in the outer shell 112A, 112B, see U.S. Pat. Nos. 5,976,453 and 4,569,471, the disclosures of which are incorporated herein by reference. The muffler 100 may include a port 142 for receiving the insulation and a cap 142 for sealing port 142. Cap 142 may be secured to the port by any suitable method such as chemical bonding, welding or mechanical attachment. Another suitable method for installing insulation is to include a preformed fibrous insulation insert, placed into cavity 110 during assembly. Processes and apparatus for forming such preforms are disclosed in U.S. Pat. Nos. 5,766,541 and 5,976,453, the disclosures of which are incorporated herein by reference; and in patent application, U.S. Ser. No. 08/802,492, the disclosure of which is also incorporated herein by reference.

One suitable absorptive silencer is a fibrous glass insert. The strand is preferably a glass fiber with a relatively high resistance to thermal degradation such as A glass, Standard E glass, S glass, T glass, ECR glass, Advantex® (Calcium-Aluminum-Silicate glass), ZenTron™ glass or any other filler composition with suitable strength and thermal properties to withstand the thermal and physical stresses inherent in a muffler. The fibrous material may comprise first and second fibrous material preforms which are received respectfully in the first and second shell parts. Alternatively, the fibrous material may comprise a loose or bagged fluffed-up, wool-type product provided within an internal cavity of the outer shell. It is also contemplated that the fibrous material may comprise a mat product wrapped about the perforated pipe or otherwise filling the internal cavity of the outer shell.

It is also contemplated that ceramic fiber material may be used instead of glass fibrous material to fill the outer shell 112A, 112B. Ceramic fibers, if continuous, could be filled directly into the shell or used to form a preform that is subsequently placed in the shell 112A, 112B. It is also contemplated that preforms may be made from a discontinuous glass fiber product produced via a rock wool process or a spinner process used to make fiberglass used as thermal insulation in residential and commercial applications. It is further contemplated that stainless steel could be wrapped about the perforated pipe 114 or made into a cylindrical preform and then slipped over the pipe 114 prior to the pipe 114 being inserted into the outer shell. It is additionally contemplated that an E-glass needle felt mat, made into a cylindrical preform, and slipped over the perforated pipe 114. A layer of stainless steel could be provided between the needle felt mat preform and the perforated pipe 114.

Figure 2:
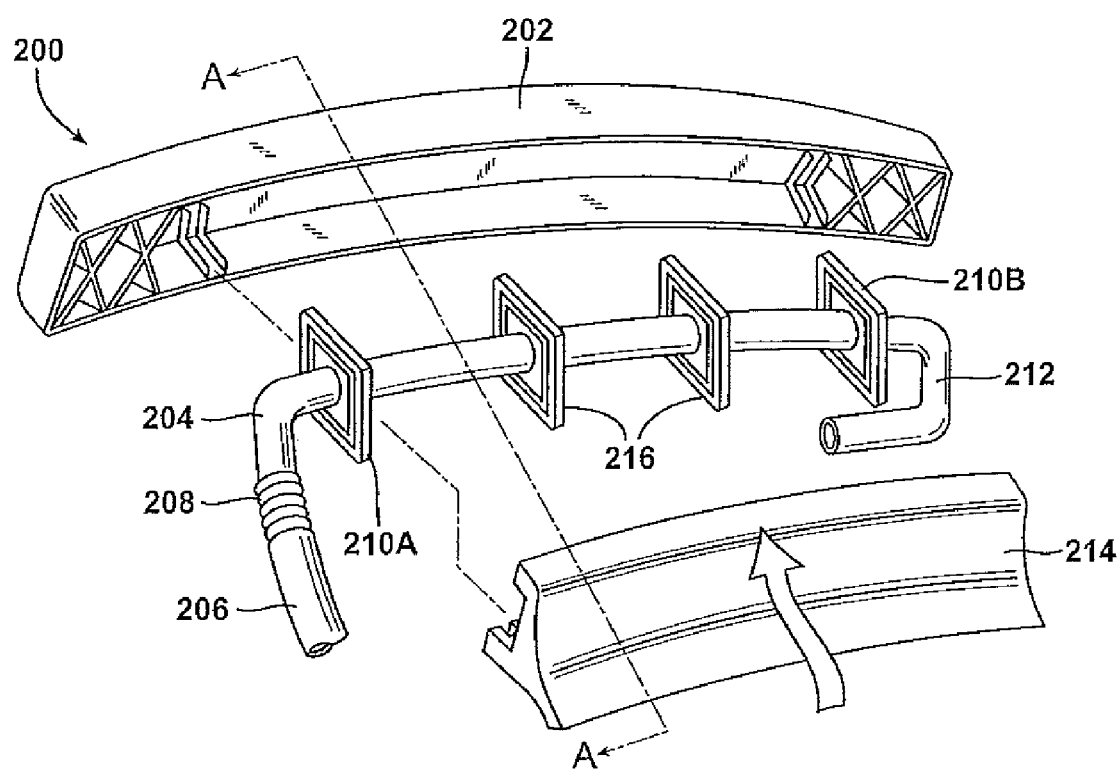
FIG. 2 is an exploded perspective view of a thermoplastic muffler in accordance with the present invention.

As shown in FIG. 2, a muffler-bumper assembly 200, in accordance with the present invention may include at least a bumper facia 202 formed of a long fiber thermoplastic material or of a standard automotive facia material such as sheet molding compound or bulk molding compound. Facia 202 provides a cavity, which encloses exhaust pipe 204 and bushings 210A, 210B. The entry bushing 210A and the exit bushing 210B may be shaped to include a sinusoidal or other form to increase surface area to act as a heat sink. As discussed above the facia may include a flange (not shown) to receive the bushings 210. The coupling between facia 202 and bushings 210 preferably include a flange (not shown) and a flexible high temperature seal (not shown). The exhaust pipe 206 may include a flexible coupler 208 to isolate vibration and noise from the engine and a tailpipe 212 for venting exhaust to the atmosphere.

In one embodiment of the invention, the bushings 210A, 210B and the internal muffler baffles 216 may be corrugated to act as energy absorbing crumple members to meet bumper crash requirements. The muffler assembly may also include an air-guide 214. Air-guide 214 increases the flow of air across the muffler assembly 200 to lower the temperature of the assembly.

Figure 2A:
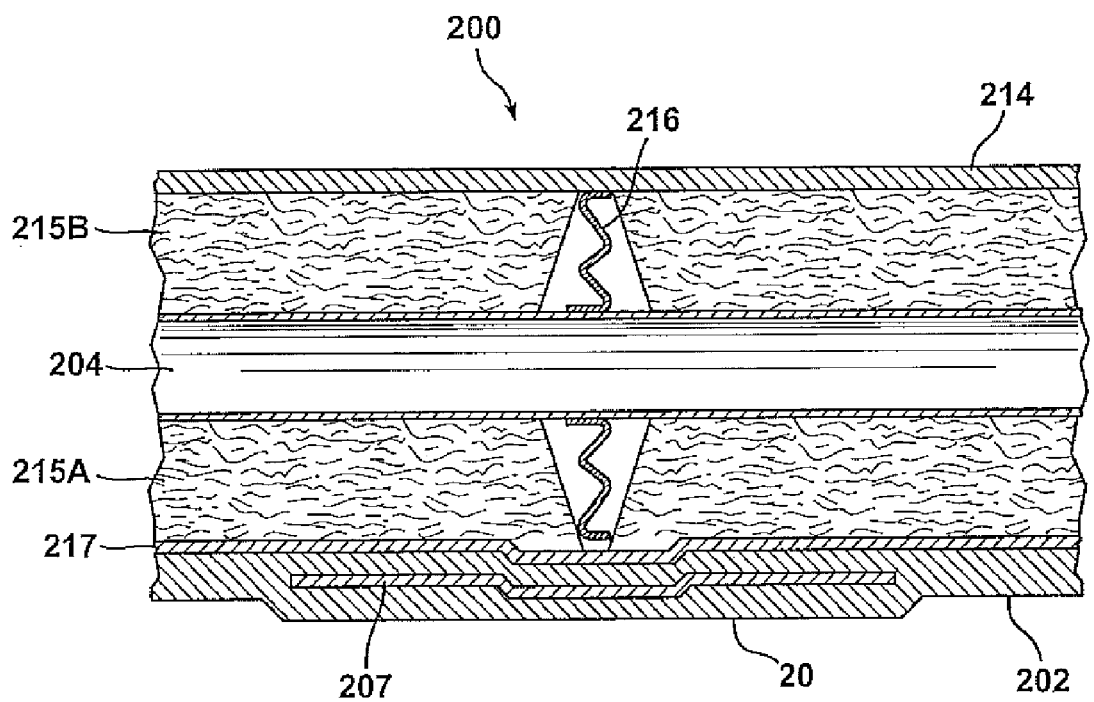
FIG. 2A is a cross-sectional view taken along line A-A of FIG. 2

FIG. 2A shows an assemble cross-section of a bumper muffler assembly 200, taken along line A-A, in which the exhaust pipe 204 and internal baffles 216 provide structural integrity to bumper muffler assembly 200. The assembly includes a first shell 202, which acts as a facia for a motor vehicle and a second shell 214. The assembly 200 also includes a first fibrous preform 215B and a second fibrous preform 215B. Also included is a fibrous mat 217 to provide additional thermal insulation between pipe 204 and first shell 202, mat 217 may be beneficial to inhibit blistering on the facia or to limit hotspots on the bumper 200, where it may contact the legs of an individual loading a trunk. Also shown is an inlay 207 to reinforce the area at external ribbing pattern 205. Inlay 207 may be place in the mold used to form shell 202. Inlay 207 provides additional strength to at least portions of the shell. Inlay 207 may be in the form of a woven or non-woven fibrous reinforcements.

Figure 2B:
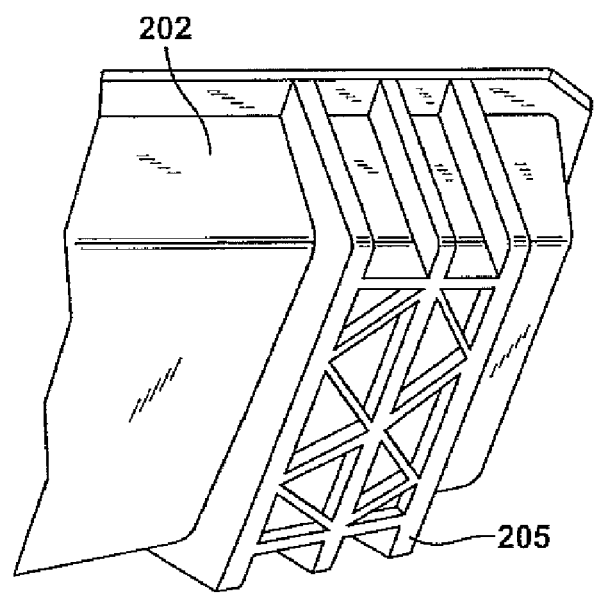
FIG. 2B is a detailed perspective view of the opposite side of the muffler of FIG. 2

FIG. 2B shows a perspective view of the first shell 202 including an external ribbing pattern 205 to increase the structural integrity and impact strength of the shell and hence the muffler assembly.

Figure 3:
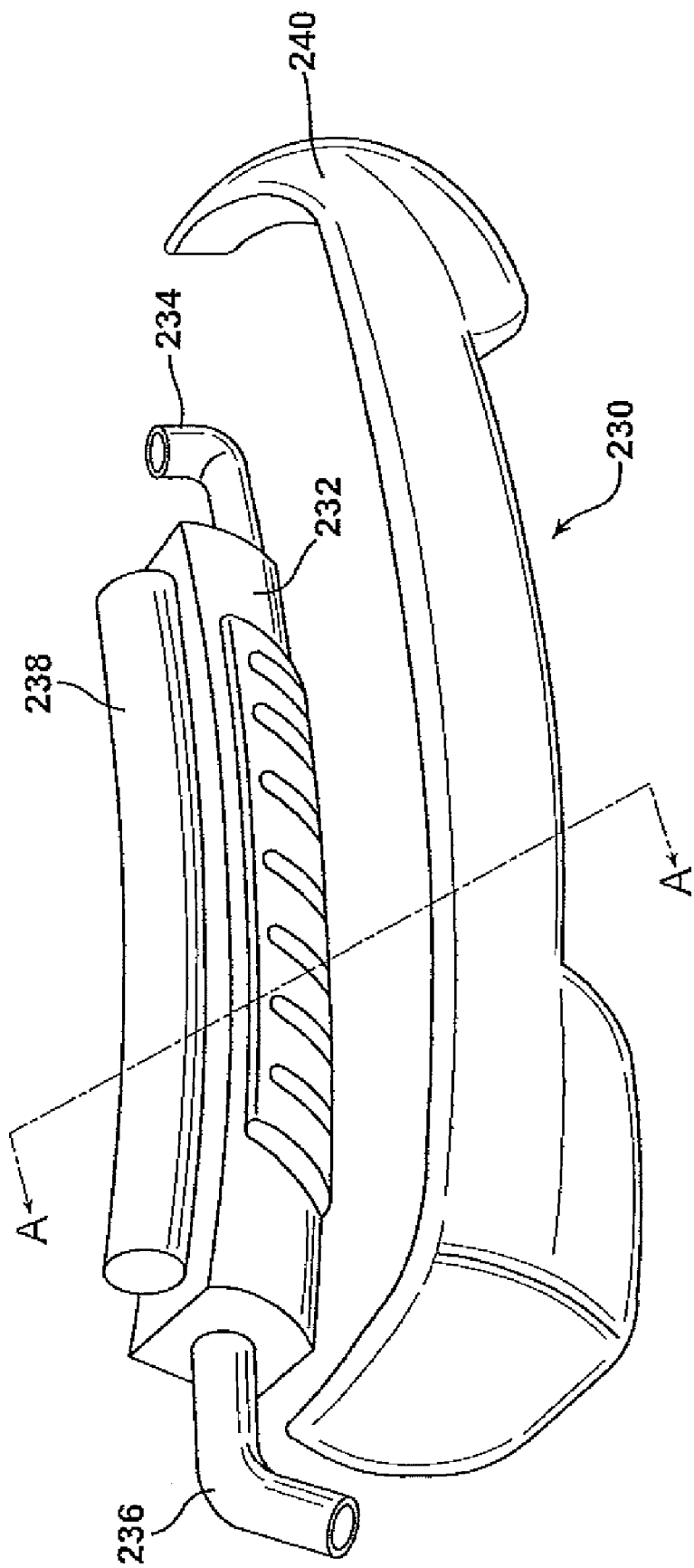
FIG. 3 is an exploded perspective view of a thermoplastic muffler in accordance with the present invention.

As shown in FIG. 3, a muffler-bumper assembly 230, in accordance with the present invention may include at least a bumper facia 240 formed of a long fiber thermoplastic material or of a standard automotive facia material such as sheet molding compound or bulk molding compound. Facia 240 typically provides a non-structural, aesthetically pleasing surface. The muffler 232 is fed by exhaust pipe 234 and vents exhaust to the atmosphere by tailpipe 236. The structure may be similar to that disclosed above, or the muffler assembly 232 may be suspended from the structural bumper member 238. FIG. 3A shows a cross-section of a bumper muffler assembly 230, in which the exhaust pipe 234 and muffler 232 are suspended from the structural impact member 234. Muffler assembly 230 may optionally be formed with and air-guide (not show) which may be integrally molded with muffler 232 or may be a separately formed piece.

Figure 4:
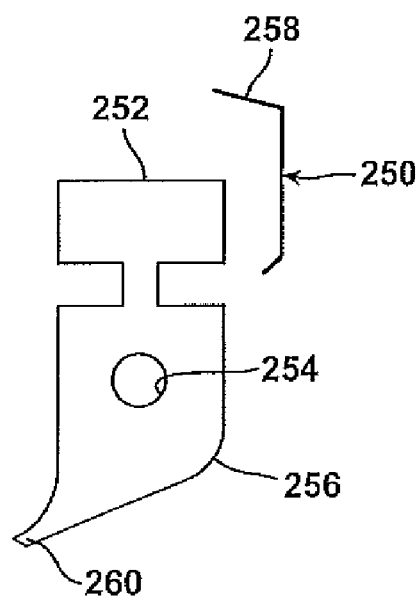
FIG. 4 is a cross-sectional view of a muffler and integrally formed impact member, in accordance with the present invention.

FIG. 4 shows a muffler assembly 250 in accordance with the present invention, in which the structural impact member 252 and the muffler 256 are molded and the exhaust pipe 254 is subsequently installed. The facia 258 may be formed of any suitable material because little strength is required. Muffler assembly 250 may optionally be formed with and air-guide 260 integrally molded. While the muffler 256 is shown as a unitary molding with the impact member 252 in FIG. 4 it would be equally possible to form the muffler assembly 256 as a separate unit for subsequent connection with the impact member 252. As shown in FIG. 2A and FIG. 2B it is also possible to form the muffler assembly 200 so that the exhaust pipe 204 forms the impact member.

Figure 5:
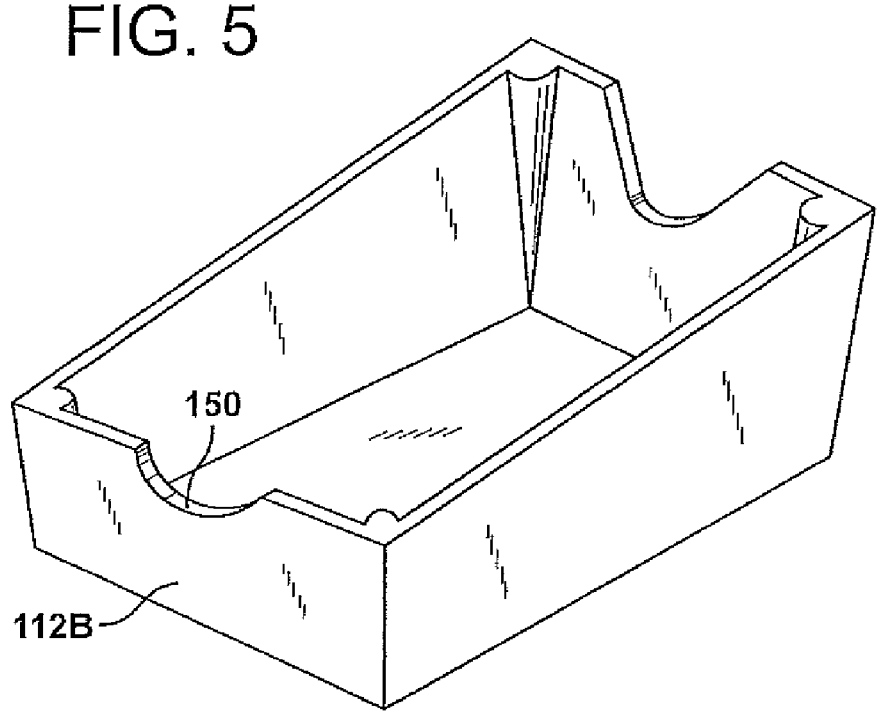
FIG. 5 is a perspective view of a muffler shell according to the present invention and showing an optional insulating blanket.

As shown in FIG. 5, a mat 150 formed of glass fibers or other suitable high temperature acoustic and thermal insulating material may be placed at the interior surface of shell 112B (as well as in opposing shell 112A (not shown)). Mat 150 serves as an airflow diffuser to avoid hot spots and to provide an even temperature load distribution. The mat may include a thin metal reflective or other heat protecting film. Mat 150 mat be fixed to shell 112B by features molded into the shell, by an adhesive or by the insertion of the fibrous insulator 152 (as seen in FIG. 5B).

Figure 6:
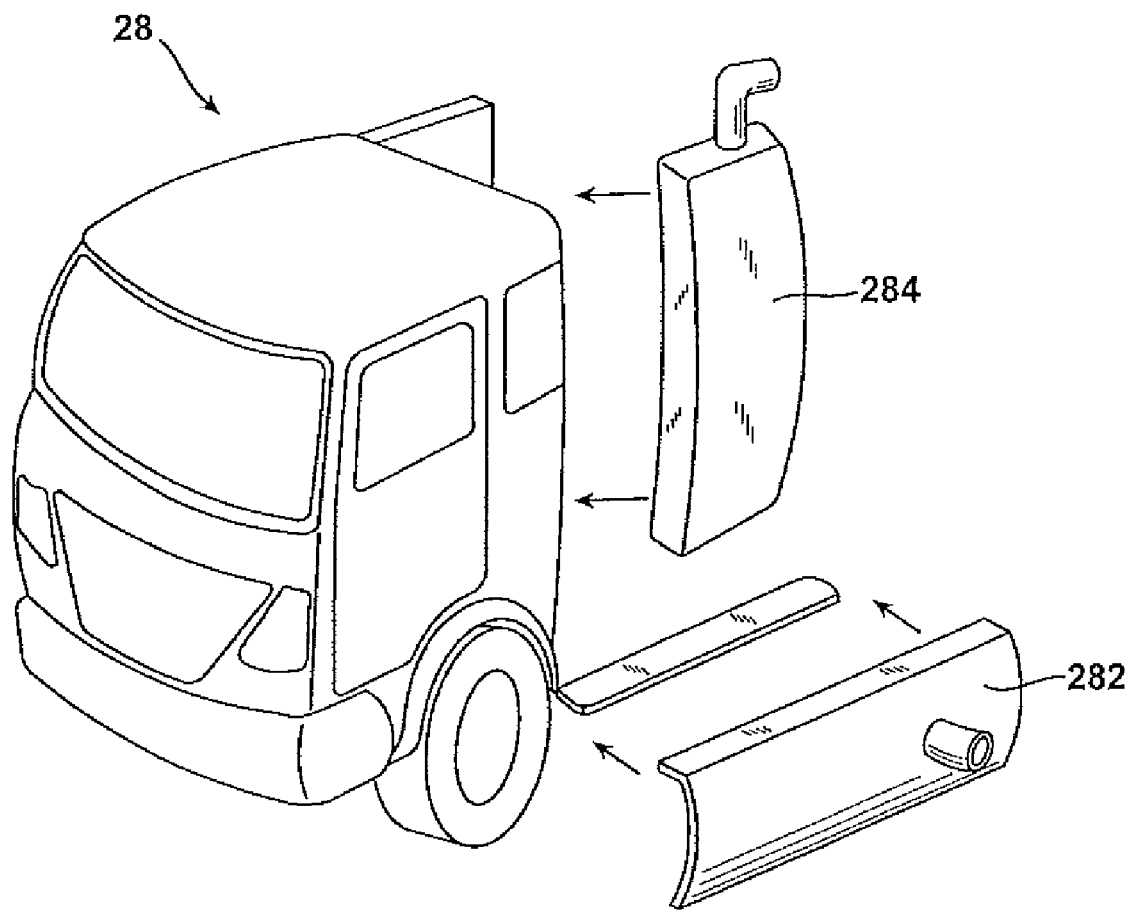
FIG. 6 is a perspective view of a commercial truck showing optional horizontal and vertical muffler assemblies, in accordance with the present invention.

As shown in FIG. 6, a commercial truck may include a muffler of the present invention in the form of a side board or rocker panel assembly 282 or as an air dam or spoiler 284.

For the purposes of the present invention, the term long fiber thermoplastic material is a material including an initial glass fiber input that is longer than 4.5 mm. There are a variety of forming methods for long fiber thermoplastics, the two most common being pelleting and direct compounding. In direct compounding, a roving is used as an input and the initial glass input is chopped to length during the mixing of the fibers with a polymer melt. Preferably, the long fiber thermoplastic material has at least 5% weight of the glass fiber fraction of the material has a mean (average) Length/Diameter ratio (L/D) greater than 35 in the molded product.

One suitable process for preparing long fiber thermoplastic materials is a so called wire coating process, as disclosed in U.S. Pat. No. 5,972,503, entitled "Chemical Treatments for Fibers and Wire-Coated Composite Strands for Molding Fiber-Reinforced Thermoplastic Composite Articles" and herby incorporated by reference. In a wire coating process wire coater is fed molten polymeric material by a conventional extruder to encase a preimpregnated glass strand. The wire coater includes a die having an exit opening for shaping the sheath into a desired thickness and/or cross-section. The encased strands may then be chopped to a predetermine length.

Figure 7:
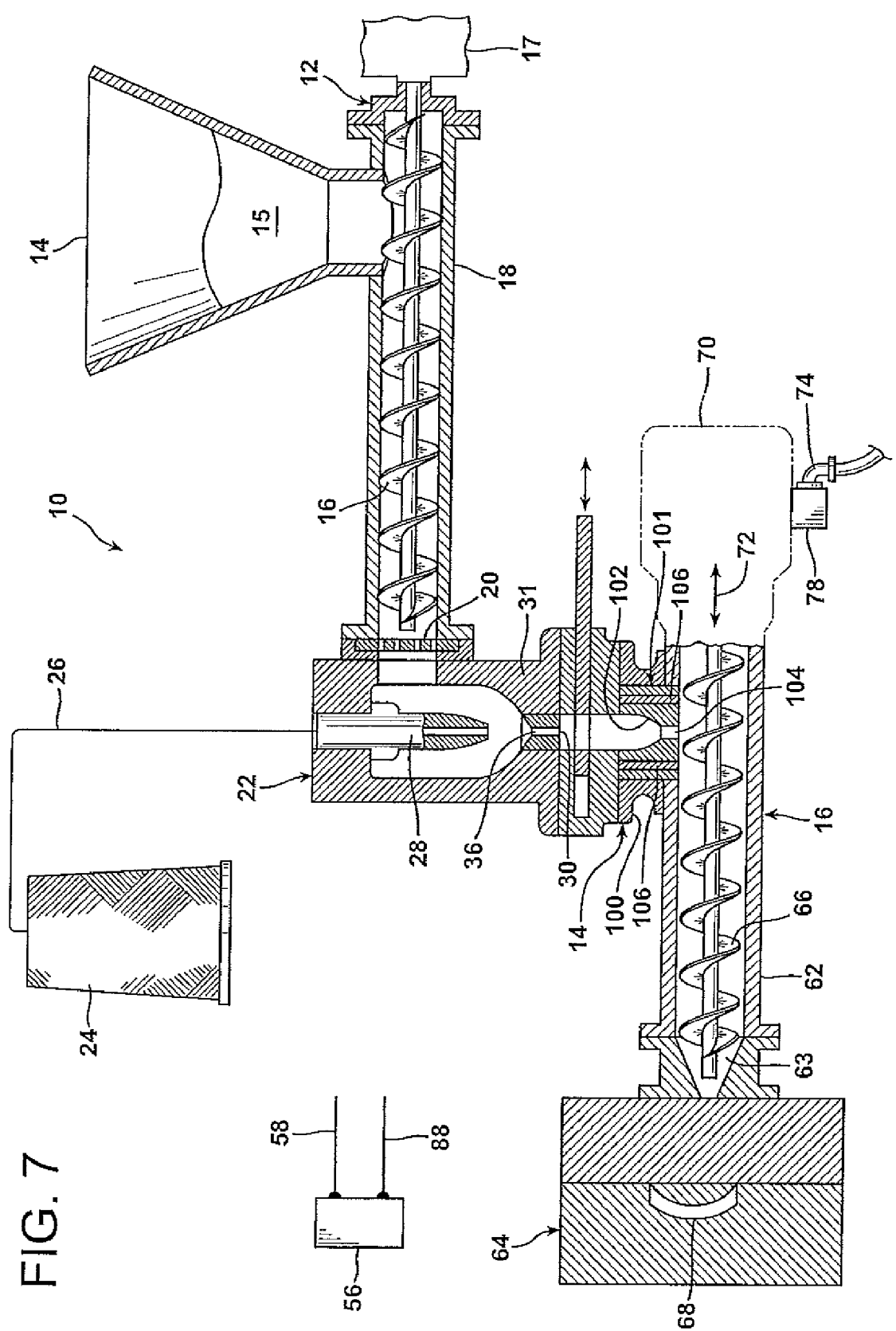
FIG. 7 is a plan view of a direct compounding long fiber thermoplastic extruder, useful in manufacturing a muffler in accordance with the present invention.

Another suitable process is a direct compounding method in which glass roving is added to a premelted thermoplastic compound. In the direct compounding process, as shown in FIG. 7 thermoplastic resin, preferably in the form of pellets, is provided to resin primary extruder 12 from a resin supply 14. The resin may be any of a variety of acceptable thermoplastic resins for the product purpose intended, such as, nylon, thermoplastic polyurethane, and polyesters. A melting screw 16 rotates within melting barrel 18 of extruder 10. While the shear force of melting screw 16 may provide sufficient heating to melt and condition the polymer, the melting barrel 18 may be provided with an additional heat source as is known in the art.

A flow control plate 20 may be used at the downstream end of barrel 40 to control the flow of resin 15 out of the extruder barrel 18 and into coating die 22. The plate 20 typically restricts the flow of resin 15 by a reduction in the diameter or by otherwise constricting the flow within the barrel 18. The coating die 22 and any apparatus in contact with the resin 15 may include suitable heat elements to maintain the desired temperature of the resin. The pressure within the coating die may be monitored by a pressure transducer that provides a control signal to the drive motor 17 of melting screw 16.

Fiber spool 24 provides a direct feed of a tow of structural reinforcing fibers 26. The fibers are pulled though injection nozzle 28 into the coating chamber 32 of coating die 22. The fibers 26 are then intimately blended and coated with the molten polymer material 15. The coated fibers 26 then exit the coating die 22 through die orifice 36 of interchangeable insert 30. The diameter of the die orifice 36 can adjusted by changing insert 30 to control the ratio of fibers 26 to resin 15.

The resin 15, fiber 26 mixture exits coating die 22 and the fibers 26 may be cut by blade 52 in cutting chamber 50 in housing 54, 56. The mixture of resin 15 and fibers 26 exit chamber 50 via orifice 58 into extruder 60. The extruder 60 typically includes a barrel 62 that feeds the mixture of resin 15 and fibers 26 into extrusion die 64. A feed screw 66 rotates with barrel 62 and may optionally reciprocate along axis 72 to feed a charge of molding material through orifice 63 into the molding cavity 68 of die 64. The feed screw 66 is driven by a power unit 70.

The temperature within the barrel 18, coating chamber 32, cutting chamber 50 and extruder 60 may be controlled by one or more heating elements and temperature probes controlled a microprocessor (not shown).

Suitable polymers include thermoplastic polymers such as polyamide (PA6, PA66, PA46, PA11, PA6.12, PA6.10 & PA12), aromatic polyamides, polyphenylene ether (PPE) and polyamide blends, blends of polyphenylene ether (PPE) and epoxy, polyetherimide (PEI) and blends thereof such as PEI/silicone, polyethersulphone (PES), polysulfone (PSU), polyethersulfone (PES), polyphthalamide (PPA), polyphenylene-sulfide (PPS), syndiotactic polystyrene (SPS), liquid crystal polymer (LCP), polybutylene terephthalate (PBT), polyethylene terephthalate (PET), thermoplastic polyurethane (TPU), polytetrafluoroethylene (PTFE), poly(vinylidene fluoride) (PVDF), polyetherketone (PEK), poletheretherketone (PEEK), aliphatic polyketone (PK), high heat polycarbonate grades (such as Tough Z HR Grade, available from IDEMITSU KOSAN, Japan) as well as other thermoplastic materials have suitable mechanical, thermal and melt flow properties. Another class of suitable thermoplastic polymers are so called ceramifiable thermoplastic polymers which may be formed as a conventional thermoplastic polymer but when heated form a material similar in properties to a ceramic material.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

We claim:

1. A fiber reinforced polymer muffler having improved properties, comprising:
   a fiber reinforced thermoplastic polymer shell having glass fiber weight fractions range from 5% to 90% wherein at least 5% weight of the glass fiber fraction has a mean Length/Diameter ratio (L/D) greater than 35, said shell including at least one shell portion:
   an exhaust duct for carrying exhaust gasses through said polymer shell; and
   a fibrous dissipative silencer.

2. The fiber reinforced polymer muffler of claim 1, wherein the fibrous dissipative silencer is selected from a group consisting of A glass, Standard E glass, S glass, T glass, ECR glass, Calcium-Aluminum-Silicate glass, S-2 glass and mineral wool.

3. The fiber reinforced polymer muffler of claim 1, further comprising a mat of fibrous material between said shell and said exhaust duct.

4. The fiber reinforced polymer muffler of claim 1, further comprising a facing selected from the group consisting of heat resistant and thermal reflective facings.

5. The fiber reinforced polymer muffler of claim 1, further comprising:
   a metallic heat sink on said exhaust duct.

6. The fiber reinforced polymer muffler of claim 1, wherein said thermoplastic is a ceramifiable polymer.

7. The fiber reinforced polymer muffle of claim 1, wherein said thermoplastic is selected from the group consisting of polamides, aromatic polyamides, polyetherimides, polyehtersulfones, polysulfones, polyphthalamides, blends of polyphenylene ether and epoxy, polyphenylsulphones, syndiotactic polystyrenes, liquid crystal polymers, polybutylene terephthalates, polyethylene terephthalates, thermoplastic polyurethanes, polytetrafluoroethylenes, polyvinylidene fluorides, polyetherketone, polyetheretherketones, aliphatic polyketone and polycarbonates and blends thereof.

8. The fiber reinforced polymer muffler of claim 1, further comprising at least one internal baffle.

9. The fiber reinforced polymer muffler of claim 8, further comprising a plurality of internal baffles.

10. The fiber reinforced polymer muffler of claim 8, wherein said at least one internal baffle is perforated.

11. The fiber reinforced polymer muffler of claim 1, further comprising an airguide for increasing flow of air across said muffler to lower operating temperatures.

12. The fiber reinforced polymer muffler of claim 1, further comprising an external ribbing pattern.

13. A molded fiber reinforced polymer muffler having improved properties, comprising:
   a fiber reinforced thermoplastic polymer shell including at least one shell portion and an air guide integrally molded with said at least one shell portion:
   an exhaust duct for carrying exhaust gasses through said polymer shell;
   a fibrous dissipative silencer; and
   a mat of fibrous material between said shell and said exhaust duct, said mat including a facing selected from a group consisting of heat resistant and thermal reflective facings.

14. The fiber reinforced polymer muffler of claim 13, further comprising:
   a metallic heat sink on said exhaust duct.

15. The fiber reinforced polymer muffler of claim 13, further comprising:
   a reinforcing inlay molded into said polymer shell.

16. The fiber reinforced polymer muffler of claim 13, further comprising an external ribbing pattern.

17. A fiber reinforced polymer muffler having improved properties, comprising:
   a fiber reinforced thermoplastic polymer shell having glass fiber weight fractions range from 5% to 90%, said shell including at least one shell portion wherein at least 5% weight of the glass fiber fraction has a mean Length/Diameter ratio (L/D) greater than 35, wherein said thermoplastic is selected from the group consisting of polamides, aromatic polyamides, polyetherimides, polyehtersulfones, polysulfones, polyphthalamides, blends of polyphenylene ether and epoxy, polyphenylsulphones, syndiotactic polystyrenes, liquid crystal polymers, polybutylene terephthalates, polyethylene terephthalates, thermoplastic polyurethanes, polytetrafluoroethylenes, polyvinylidene fluorides, polyetherketone, polyetheretherketones, aliphatic polyketone and polycarbonates and blends thereof;

an exhaust duct for carrying exhaust gasses through said polymer shell;
a fibrous dissipative silencer;
a mat of fibrous material between said shell and said exhaust duct; and
a facing selected from the group consisting of heat resistant and thermal reflective facings.

* * * * *